(12) United States Patent
Baudisch et al.

(10) Patent No.: US 7,692,629 B2
(45) Date of Patent: Apr. 6, 2010

(54) OPERATING TOUCH SCREEN INTERFACES

(75) Inventors: Patrick Baudisch, Seattle, WA (US);
Kenneth P. Hinckley, Redmond, WA (US); Raman Sarin, Redmond, WA (US); Edward B. Cutrell, Seattle, WA (US); Andrew D. Wilson, Seattle, WA (US); Daniel Vogel, Sackville (CA)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 11/635,730

(22) Filed: Dec. 7, 2006

(65) Prior Publication Data

US 2008/0136785 A1     Jun. 12, 2008

(51) Int. Cl.
    *G06F 3/033* (2006.01)
    *G06F 3/041* (2006.01)
(52) U.S. Cl. ..................... 345/157; 345/173
(58) Field of Classification Search ............... 345/156, 345/157, 173
    See application file for complete search history.

(56) References Cited

U.S. PATENT DOCUMENTS

| 7,075,512 B1 * | 7/2006 | Fabre et al. ............. 345/156 |
| 2006/0161846 A1 * | 7/2006 | Van Leeuwen ............ 345/173 |

FOREIGN PATENT DOCUMENTS

| WO | WO 94/29788 | 12/1994 |
| WO | WO 00/75766 | 12/2000 |
| WO | WO 2004/051392 | 6/2004 |

OTHER PUBLICATIONS

Albinsson, P. Zhai, S. (2003). High precision touch screen interaction. In *Proc. of CHI' 2003*, 105-112.
Balakrishnan, R. MacKenzie, S. (1997). Performance differences in the fingers, wrist, and forearm in computer input control. In *Proc. of CHI'97*, 303-310.
Baudisch, P., Cutrell, E., Robbins, D., Czerwinski, M., Tandler, P. Bederson, B., Zierlinger, A. (2003). Drag-and-Pop and Drag-and-Pick: Techniques for Accessing Remote Screen Content on Touch and Pen-operated Systems. In *Proc. of Interact'03*, 57-64.
Baudisch, P., Tan, D., Collomb, M., Robbins, D., Hinckley, K., Agrawala, M., Zhao, S., and Ramos, G. (2006). Phosphor: Explaining Transitions in the User Interface Using Afterglow Effects. To appear in *Proc. UIST' 06*.
Benko, H., Wilson, A., Baudisch, P. (2006). Precise selection techniques for multi-touch screens. *Proc. of CHI' 06*, 1263-1272.
Blanch, R. Guiard, Y., Beaudouin-Lafon M. (2004). Semantic Pointing: Improving Target Acquisition with ControlDisplay Ratio Adaptation. In Proc. of. CHI'04, 519-526.
Buxton, W., Hill, R., Rowley, P. (1985). Issues and Techniques in Touch-Sensitive Tablet Input. *Computer Graphics*, 19(3):215-224.

(Continued)

*Primary Examiner*—Regina Liang

(57) ABSTRACT

Techniques and technologies are provided which can allow for touch input with a touch screen device. In response to an attempt to select a target displayed on a screen, a callout can be rendered in a non-occluded area of the screen. The callout includes a representation of the area of the screen that is occluded by a selection entity when the attempt to select the target is made.

22 Claims, 5 Drawing Sheets

OTHER PUBLICATIONS

Esenther, A., Ryall, K. (2006). Fluid DTMouse: better mouse support for touch-based interactions. *Proc. AVI '06*, 112-115.

Fitzmaurice, G., Khan, A., Pieké, R., Buxton, B., and Kurtenbach, G. (2003). Tracking menus. In *Proc. of UIST '03*, 71-79.

Grossman, T, Balakrishnan, R. (2005). The bubble cursor: enhancing target acquisition by dynamic resizing of the cursor's activation area. In *Proc. of CHI'05*, 281-290.

Hancock, M., Booth, K. (2004). Improving Menu Placement Strategies for Pen Input. In *Proc. of GI'04*, 221-230.

Kabbash, P., Buxton, W. (1995). The "Prince" technique: Fitts' law and selection using area cursor. In *Proc. of CHI'95*, 273-279.

Karlson, K., Bederson, B., SanGiovanni, J. (2005). AppLens and LaunchTile: two designs for one-handed thumb use on small devices. In *Proc. of CHI'05*, 201-210.

Karlson, A., Bederson, B., Contreras-Vidal, J. (2006) Understanding Single-Handed Mobile Device Interaction. *Tech Report HCIL-2006-02*.

Mankoff J., Hudson S., Abowd G. (2000). Interaction techniques for ambiguity resolution in recognition-based interfaces. In *Proc. of UIST '00*, 11-20.

Matsushita, N., Ayatsuka, Y., Rekimoto, J. (2000). Dual touch: A two-handed interface for pen-based PDAs. In *Proc. of UIST'00*, 211-212.

Olwal, A., Feiner S. (2003) Rubbing the Fisheye: precise touch-screen interaction with gestures and fisheye views. In *Conf. Supp. of UIST'03*, 83-84.

Potter, R., Weldon, L., Shneiderman, B. (1988). Improving the accuracy of touch screens: an experimental evaluation of three strategies. *Proc. CHI* 88, 27-32.

Ren, X., Moriya, S. (2000). Improving selection performance on pen-based systems: a study of pen-based interaction for selection tasks. *ACM TOCHI.* 7(3):384-416.

Shneiderman, B. (1991). Touch Screens Now Offer Compelling Uses. *IEEE Softw.* 8, 2. 93-94, 107.

Sears, A., Shneiderman, B. (1991). High precision touchscreens: design strategies and comparisons with a mouse. *Int. J. Man-Mach. Stud.* 34(4):593-613.

Vogel, D. Balakrishnan, R. (2005). Distant freehand pointing and clicking on very large, high resolution displays. In *Proc. of UIST '05*, 33-42.

Wigdor, D., Leigh, D., Forlines, C., Shipman, S., Barnwell, J., Balakrishnan, R., Shen, C. (2006). Under the Table Interaction. To appear *Proc. of UIST'06*.

International Search Report regarding International Application No. PCT/US2007/086707 dated Apr. 29, 2008.

\* cited by examiner

OPERATING TOUCH SCREEN INTERFACES

BACKGROUND

Many devices, such as personal digital assistants (PDAs), mobile phone-PDA hybrids, and ultra mobile personal computers (UMPCs), utilize pen-based input to help the user clearly define a selection point on a screen yet they also support touch input. The pen or stylus is usually thin, and also helps create a vertical offset between the user's hand and the screen so that targets appearing on the screen are not occluded by the users' finger or hand. However, retrieving the stylus takes time and can be inconvenient, for example, in the context of one-handed operation, or can be inefficient, for example, in the context of short/intermittent interactions.

When use of a stylus is inefficient or inconvenient, users sometimes use their finger or other "touch input" to select objects displayed on the screen of the device. For instance, this is often the case, for intermittent or short interactions such as verifying a meeting time, navigating a map, or controlling a media player.

BRIEF SUMMARY

A shift pointing technique is provided which is designed to allow users to operate a user interface with a selection entity such as their fingers by preventing occlusion and defining a clear selection point when a user uses touch to operate a touch screen device. When a user attempts to select a small target displayed on a screen of a touch sensitive display device, a shift pointing technique creates and displays a callout showing a representation of the occluded screen area and places the representation of the occluded screen area in a non-occluded screen location. The occluded area is the area of a touch screen occluded by the user's finger or other selection entity. The callout also shows a pointer representing a current selection point of the user's finger or other selection entity. Using visual feedback provided by the callout, the user can guide the pointer into the target by moving (e.g., dragging or rolling) their finger or other selection entity on the screen surface. The user can then commit to target acquisition (e.g., select the small target) by lifting their finger or other selection entity off the screen of the device. By contrast, when a user attempts to select a larger target on the screen of the touch screen device, no callout is created and users enjoy the full performance of an unaltered touch screen.

Thus, in addition to offsetting the pointer, the shift pointing technique offsets screen content to provide significantly better targeting performance. These techniques can allow users to select small targets with much lower error rates than an unaided touch screen, and can reduce errors caused by occlusion of the target by a user's finger (or other selection entity) and ambiguity about which part of the finger (or other selection entity) defines the selection point on the display or screen. As such, error rates can be reduced when using touch input with a touch screen device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of an example embodiment may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims.

Example embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that practical embodiments may be practiced in conjunction with any number of data transmission protocols and that the system described herein is merely one example embodiment.

For the sake of brevity, conventional techniques related to computing device operation, touch screen operation, the rendering of graphics on a display element, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example embodiment.

Figure 1:
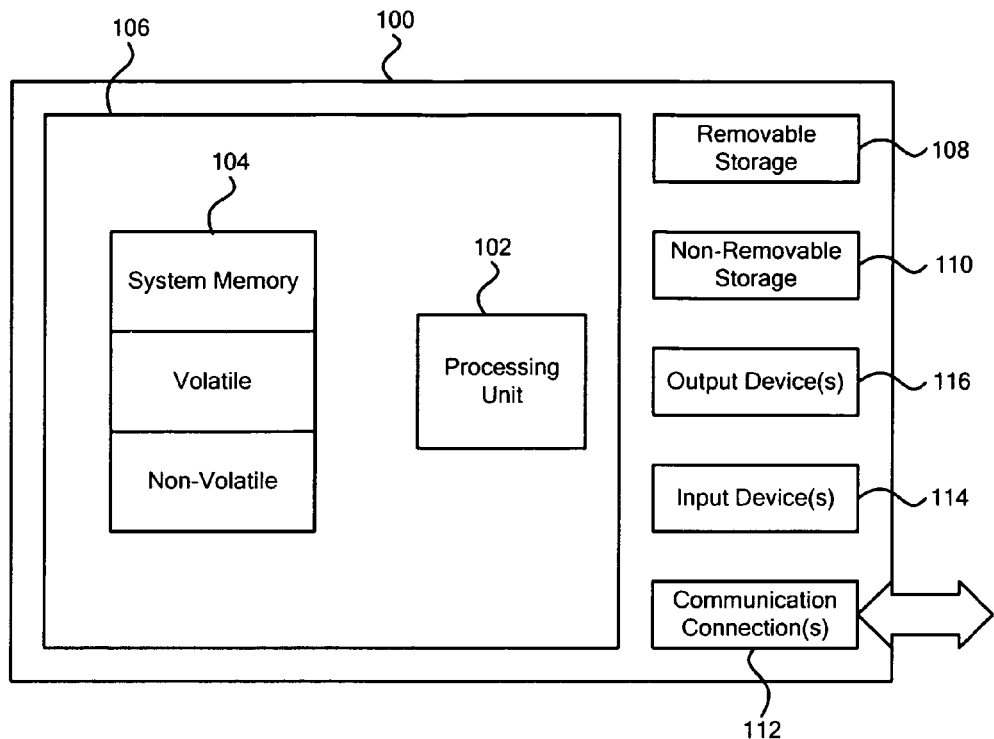
FIG. 1 is a simplified schematic representation of an example computer system according to one exemplary implementation.

FIG. 1 is a simplified schematic representation of an example computer system 100 for implementing a touch screen device. Computer system 100 is only one example of a suitable operating environment and is not intended to suggest any limitation as to the scope of use or functionality of the implementations described herein. Other well known computing systems, environments, and/or configurations that may be suitable for use with such implementations include, but are not limited to, personal computers, server computers, hand-held or laptop devices, personal digital assistants, mobile telephones, kiosk-based computers such as Automated Teller Machines (ATMs) and in-flight entertainment systems, retail product information systems, Global Positioning System (GPS) navigation devices, location maps, building directories, portable media players, electronic books, transit kiosks, museum information displays, multiprocessor systems, microprocessor-based systems, programmable consumer electronics, network PCs, minicomputers, mainframe computers, distributed computing environments that include any of the above systems or devices, and the like.

Computer system 100 may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various implementations.

Computer system 100 typically includes at least some form of computer readable media. Computer readable media can be any available media that can be accessed by computer system 100 and/or by applications executed by computer system 100. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer system 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring again to FIG. 1, in its most basic configuration, computer system 100 typically includes at least one processing unit 102 and a suitable amount of memory 104. Depending on the exact configuration and type of computing system 100, memory 104 may be volatile (such as RAM), non-volatile (such as ROM, flash memory, etc.) or some combination of the two. This most basic configuration is identified in FIG. 1 by reference number 106. Additionally, computer system 100 may also have additional features/functionality. For example, computer system 100 may also include additional storage (removable and/or non-removable) including, but not limited to, magnetic or optical disks or tape. Such additional storage is illustrated in FIG. 1 by removable storage 108 and non-removable storage 110. Memory 104, removable storage 108, and non-removable storage 110 are all examples of computer storage media as defined above.

Computer system 100 may also contain communications connection(s) 112 that allow the system to communicate with other devices. Communications connection(s) 112 may be associated with the handling of communication media as defined above.

Computer system 100 may also include or communicate with input device(s) 114 such as a keyboard, mouse or other pointing device, voice input device, a pen, stylus or other input device, etc. In the example embodiment described below with reference to FIG. 2, the computer system 100 includes a screen, display or other user interface (UI) which can accept a touch input and allow a user to select certain objects displayed on the screen. Although the example embodiment described herein utilizes a touch input, embodiments described herein can be equivalently configured to also support any equivalent touch-based input, such as that occurring with use of a pen or stylus. Computer system 100 may also include or communicate with output device(s) 116 such as a display, speakers, printer, or the like. All of these devices are well known in the art and need not be discussed at length here.

Overview

Although convenient, using touch input can increase targeting times and error rates. Unfortunately, user interfaces designed for pen or stylus input often contain small targets, and in such cases selection with a finger can become slow and error prone. For example, using a finger or other form of "touch input" occludes small targets forcing target selection and acquisition to be done without visual feedback. This makes selection and acquisition error prone.

While fingers are somewhat less accurate than a stylus in terms of fine control, accuracy is not the only reason for high error rates associated with touch input. Other reasons for the high error rates associated with touch input are due to the ambiguous selection point created by the finger's contact area in combination with the occlusion of the target. For instance, users have difficulty determining whether they have acquired the target when selecting targets smaller than the size of the finger contact area. Unfortunately, the user's finger also occludes targets smaller than the finger's contact area thereby preventing users from seeing visual feedback.

Broadly, techniques and technologies are provided which can improve the operation of a pen-based or touch screen device, such as a PDA or UMPC. These techniques and technologies can allow for touch input when a user's finger or other selection entity (e.g., another body part) touches a screen of a touch screen device to attempt to select an object displayed on a screen. When a user attempts to select the target, a callout can be rendered in a non-occluded screen area of the screen. The callout includes a representation of the area of the screen that is occluded by the user's finger (or other selection entity). In some implementations, the "representation of the area of the screen that is occluded" may comprise a copy of the screen area that is occluded by the user's finger (or other selection entity).

In the following description, escalation or "shift pointing" techniques will be described with reference to scenarios in which a user attempts to select a target using their finger. However, it will be appreciated that the escalation or "shift pointing" techniques can also generally be applied whenever a user attempts to select a target using any "selection entity." As used herein, the term "selection entity" can encompass a body part such as a finger or fingernail, or other selection instrument which blocks or occludes an area of the touch screen device when the user attempts to select a target that is displayed in the occluded area using the selection entity.

Figure 2:
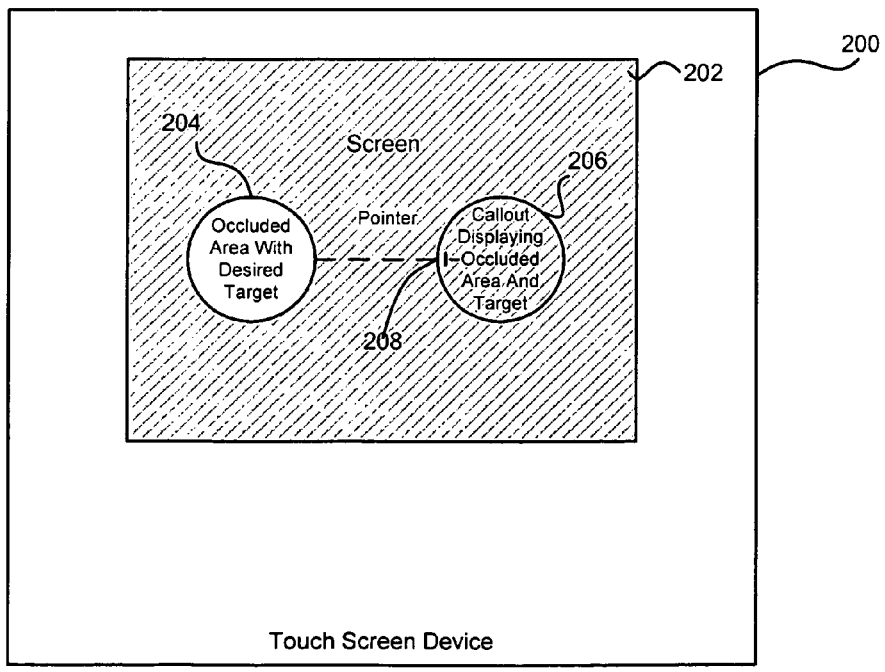
FIG. 2 is a simplified schematic representation of a front view of a touch screen device according to one exemplary implementation.

FIG. 2 is a simplified schematic representation of a front view of a touch screen device 200. The touch screen device 200 may be implemented within any suitably configured computing device or system, for example, computer system 100.

The touch screen device 200 comprises a touch screen 202 for displaying information including a desired target a user wants to select. As used herein, the term "touch screen" refers to a screen, display or other UI which is configured or designed to allow for touch input by pressing on an area of the screen, display or other UI to select an object displayed on the screen, display or other UI. For instance, a user may press on the screen with a device, such as a stylus or pen, or touch the screen with a user's finger or other appendage. A touch screen device can be implemented in any of a number of electronic devices, including, for example, portable appliances such as cellular telephones, PDAs, laptop computers, video games, electronic toys, electronic control pads for any number of different applications; fixed kiosks for information distribution, such as ATMs.

When a user attempts to select a desired target (not shown in FIG. 2) displayed on the touch screen 202, the user can place his or her finger over the desired target on the touch screen 202. The area of the touch screen 202 which is covered by the user's finger can be referred to as an occluded screen area 204 of the touch screen 202. This occluded screen area 204 comprises an area of the screen 202 which is covered by the user's finger and which includes the desired target the user is attempting to select. The desired target occupies a first area on the screen 202 that is within the occluded screen area 204.

When the user's finger touches a surface of the touch screen 202 to attempt to select a desired target displayed on the screen 202, a module or module(s) within the touch screen device 200 operate in cooperation with a processing unit 102 to determine if occlusion is a problem for the desired target (under the user's finger).

When it is determined that occlusion is likely to be a problem with respect to the desired target under the user's finger, a callout 206 and a pointer 208 can be displayed or rendered. The decision to display or render the callout 206 and pointer 208 can be referred to as "escalation." Exemplary techniques for determining whether or not to display or render the callout 206 and the pointer 208 (or to "escalate") can include, but are not limited to, for example, a user-input-based trigger, a dwell timer-based trigger, or a target size-based trigger. These techniques for determining whether to escalate will be described in further detail below.

Figure 7:
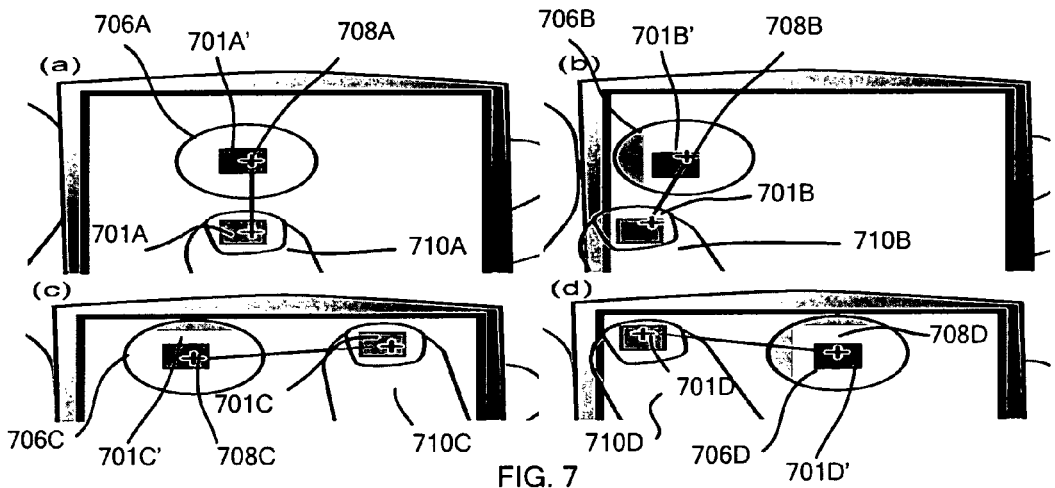
FIGS. 7(a)-(d) are diagrams which illustrate exemplary positioning of a callout and pointer relative to different locations of a user's finger on a screen of a touch screen device.

As used herein, the term "callout" refers to a shifted representation of the occluded screen area (which typically includes a representation of the desired target). In some implementations, the "representation of the area of the screen that is occluded" may comprise a copy of the screen area that is occluded by the user's finger (or other selection entity). In some implementations, the callout can move in response to input movement, display updates, or for other reasons, and thus does not necessarily need to be placed statically. A callout can generally be of any suitable size and any suitable shape. In the particular example, shown in FIG. 2, the copy portion of the callout 206 is shown having a circular shape or frame, however, the copy portion may have a rectangular shape or frame, a square shape or frame, an elliptical shape or frame, a cartoon bubble shape or frame, or any combinations thereof. The callout 206 can also be located or placed at (or translated to) any suitable location in the non-occluded screen area (shown with cross-hatching in FIG. 2). Examples of callout placement will be provided below with respect to FIG. 7. Moreover, the callout 206 can be the same size as the occluded area, smaller than the occluded area or larger than the occluded area depending on the implementation. In one exemplary "zoom" implementation, described below with reference to FIG. 9, the callout 206 is larger than the occluded area. This implementation is particularly helpful in situations where the desired target is particularly small and difficult to select.

As used herein, the term "pointer" refers to the current system input coordinate specified by an input device, such as a user's finger, and represents an actual contact or selection point on the screen. In one implementation, the shifted pointer 208 and actual contact point under the finger are connected with a dashed line as shown in FIG. 2. The actual contact point represents an actual current contact or selection point of the user's finger within the occluded screen area 204. Thus, in addition to offsetting the pointer 208, the callout 206 offsets a representation of the occluded screen content which can lead to significantly better targeting performance.

When a decision to escalate is made, a module or module(s) within the touch screen device 200 operate in cooperation with a processing unit 102 to execute computer instructions for displaying or rendering the callout 206 and the pointer 208 in the non-occluded screen area (shown with cross-hatching in FIG. 2) of the touch screen 202.

The pointer 208 is movable when the user attempts to select the desired target such that the pointer 208 can be moved by moving the finger on the surface of the screen 202. Visual feedback provided to the user by the callout 206 allows the user to move the pointer 208 over the representation of the desired target displayed in the callout 206. For instance, the user can guide the pointer 208 over the representation of the desired target displayed in the callout 206 by keeping their finger on the occluded screen area 204 of the touch screen 202, and guiding the pointer 208 by moving or rolling their finger on the surface of the touch screen 202 (in the occluded screen area 204) until the pointer 208 is over the representation of the desired target.

To select the desired target, the user commits to target acquisition by lifting their finger off the surface of the screen 202 when the pointer 208 is over the representation of the desired target displayed in the callout 206. In one implementation, successful target acquisition can be confirmed with a click sound, while unsuccessful target acquisition attempts can result in an error sound. A module or module(s) within the touch screen device 200 operate in cooperation with a processing unit 102 to remove the callout 206 and pointer 208 when the user lifts their finger off the surface of the touch screen 202.

Figure 3:
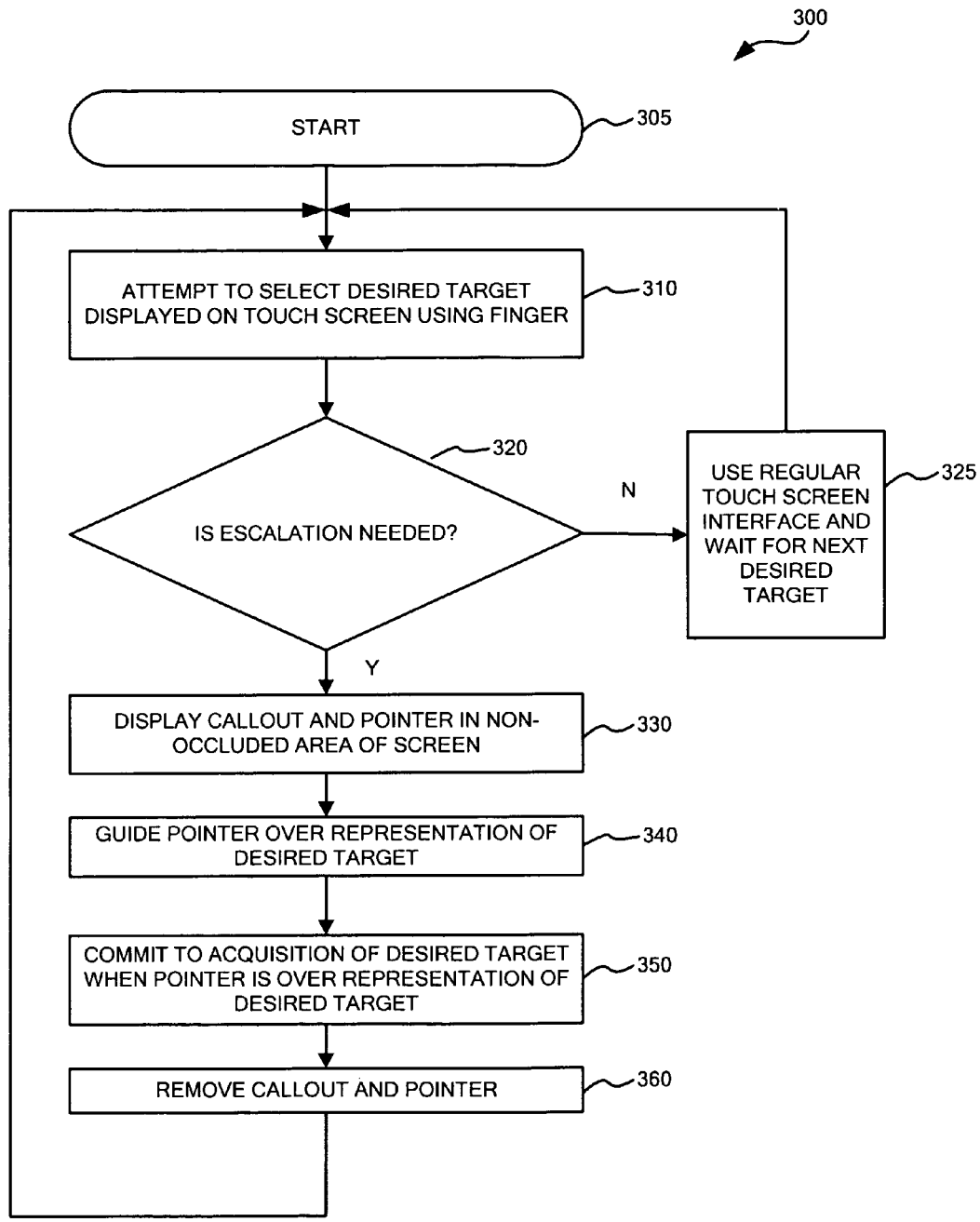
FIG. 3 is an exemplary flow diagram of techniques for selecting a desired target displayed on a screen of a touch screen device using touch input according to one exemplary implementation.

FIG. 3 is an exemplary flow diagram 300 of techniques for selecting a desired target displayed on a screen of a touch screen device using touch input according to one exemplary implementation. FIG. 3 will be described with reference to FIGS. 4(a)-4(e) and FIG. 5(a)-5(b) to illustrate how the techniques of FIG. 3 can be applied in one exemplary implementation. FIGS. 4(a)-4(e) are a series of exemplary diagrams 400 illustrating an escalation or "shift pointing" technique for selecting a relatively small target displayed on a screen of a touch screen device using touch input according to one exemplary implementation. FIG. 5(a)-5(b) a series of exemplary diagrams 500 showing a regular technique for selecting a larger target displayed on a screen of a touch screen device using touch input according to another exemplary implementation.

At step 310, a user attempts to acquire or select a desired target displayed on a display or screen of the touch screen device by touching the device display surface (e.g., the surface of the device) with their finger. For example, as shown in FIG. 4(a) and FIG. 5(a), the user presses on a surface of the screen with their finger 410, 510 (or other object including other body parts or devices) to attempt to select the desired target 401, 501. In FIG. 4(a), the desired target 401 occupies a first, small area displayed on the screen under the user's finger 410. The desired target 401 is near a number of other possible targets (shown as small rectangles). The area of the screen which is covered by the user's finger 410 (and includes the desired target 401 and other possible targets) is referred to below as an "occluded" area which the user can not see. In FIG. 5(a), the desired target 501 occupies a relatively larger area displayed on the screen which is not completely covered by the user's finger 510. In other words, in FIG. 5(a), the desired target 501 is only partially occluded since some portions of the desired target 501 are still visible.

Conditional escalation overcomes occlusion problems and allows users to select small targets reliably. The escalation or shift pointing technique helps to ensure that interaction overhead is limited to situation in which it is really necessary (e.g., small targets) which can save a significant amount of time. At step 320, a processor or other module in the touch screen device determines whether "escalation" is needed with respect to the particular desired target. In general, a processor or other module in the touch screen device determines if occlusion is a problem given the possible targets displayed in the occluded screen area under the user's finger. Any number of different techniques can be used to determine whether or not escalation is to be performed (e.g., to determine whether or not to display or render the callout and the pointer). These techniques can include, but are not limited to, for example, a user-input-based trigger, a dwell timer-based trigger, or a target size-based trigger. These techniques will be described below.

If it is determined that escalation is not needed (e.g., occlusion is not a problem for the desired target under the user's finger), then at step 325, the touch screen device continues to operate in its normal or regular manner like an unmodified touch screen (e.g., without invoking escalation). The process 300 waits for the next desired target, and loops back to step 310. In the exemplary scenario depicted in FIGS. 5(a) and 5(b), the callout is not created or displayed when the user attempts to select a larger target on the screen of the touch screen device. By lifting their finger immediately, the user makes the selection as if using an unaided touch screen. Here, the simplicity of an unaided touch screen input make it adequate for the larger sized target.

The escalation or shift pointing technique also behaves as touch screen users expect in that it allows users to aim for the actual target itself. By allowing users to aim for the actual target, the escalation or shift pointing technique remains compatible with regular pen and touch input. This compatibility keeps the interaction consistent when switching back and forth between pen and touch input. This also makes it easy to deploy the escalation or shift pointing technique in walk-up scenarios or to retrofit existing systems.

If it is determined that escalation is needed (e.g., occlusion is a problem for the desired target under the user's finger), then at step 330, a callout and pointer can be rendered or displayed on the non-occluded area of the screen.

The escalation or shift pointing technique also behaves as touch screen users expect in that it allows users to aim for the actual target itself. By allowing users to aim for the actual target, the escalation or shift pointing technique remains compatible with regular pen and touch input. This compatibility keeps the interaction consistent when switching back and forth between pen and touch input. This also makes it easy to deploy the escalation or shift pointing technique in walk-up scenarios or to retrofit existing systems.

The callout and pointer can help to eliminate problems associated with occlusion, and can also help reduce problems associated with actual contact or selection point ambiguity. For example, as shown in FIG. 4(b), a callout 406 and pointer 408 can be provided or displayed in a non-occluded area of the screen. The callout 406 displays a representation of the occluded screen area (e.g., the area covered by the user's finger 410) on the non-occluded area of the screen. This representation of the occluded screen area can include, for example, a copy 401' of the desired target 401. The pointer 408 represents an actual contact or selection point of the user's finger on the screen. Upon initial display of the pointer 408, the pointer 408 does not coincide with the copy 401' of the desired target 401.

Moreover, it should be appreciated that while the position of the callout 406 is shown as being displayed above the target and the user's finger, as will be described below with respect to FIG. 6, the callout 406 can be positioned at any convenient location within the non-occluded area of the screen relative to either the target or the user's finger. Placement of the callout and pointer should be done in way which can help to minimize occlusion and to maximize predictability to accelerate visual re-orientation.

At step 340, the user guides the pointer over the representation of the desired target to select the desired target. For example, as shown in FIG. 4(c), while keeping their finger 410 in contact with the screen, the user can guide the position of the pointer 408 based on visual feedback provided by the callout 406. The user can make corrective movements and fine-tune the pointer position by moving their finger on the surface of the screen until the pointer 408 is over the copy 401' of the desired target 401 displayed in the non-occluded screen area of the screen.

When the pointer is over the representation of the desired target, at step 350, the user commits to target acquisition of the desired target. For example, as shown in FIG. 4(d), to select the desired target the user commits to target acquisition of the desired target 401 by lifting their finger 410 off the surface of the screen (e.g., take-off selection) while the pointer 408 is over the copy 401' of the desired target 401 that is displayed in the non-occluded screen area. In one implementation, successful target acquisition can be confirmed with a click sound, while unsuccessful target acquisition attempts can result in an error sound. In another implementation, once the correct position is visually verified, lifting the finger 410 selects the target 401, causes a brief Phosphor afterglow and completes the selection.

Figures 4, 5:
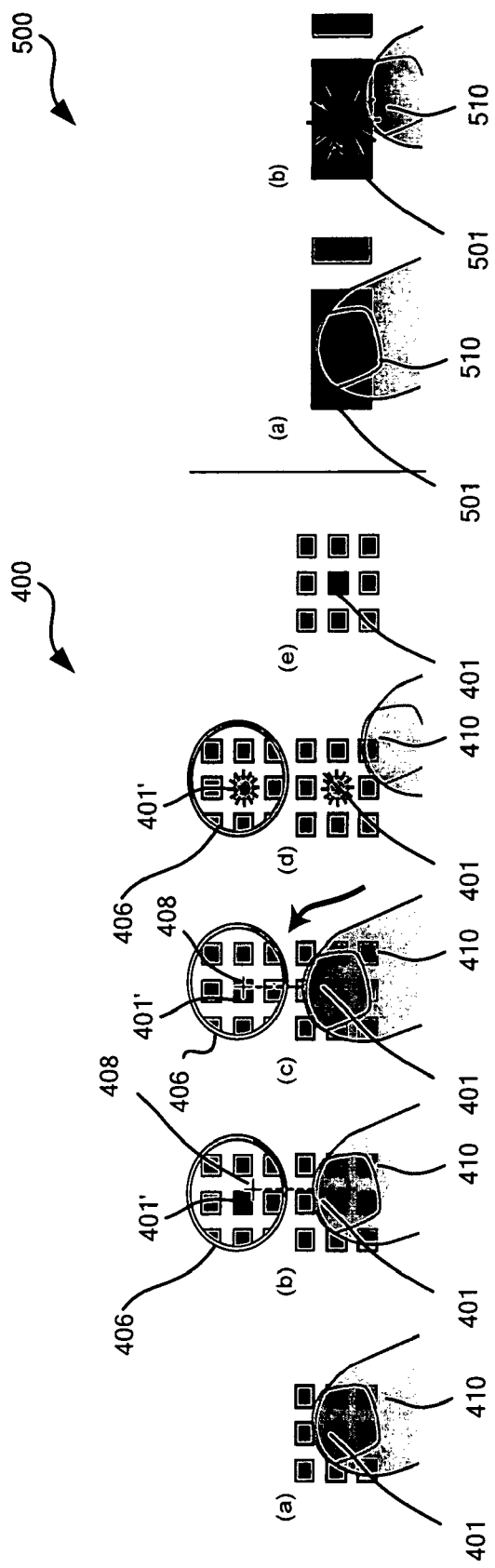
FIGS. 4(a)-4(e) are a series of exemplary diagrams illustrating an escalation or "shift pointing" technique for selecting a relatively small target displayed on a screen of a touch screen device using touch input according to one exemplary implementation.
FIG. 5(a)-5(b) a series of exemplary diagrams showing a regular technique for selecting a larger target displayed on a screen of a touch screen device using touch input according to another exemplary implementation.

At step 360, the callout and pointer are removed when the user lifts their finger off the surface of the screen. For example, as shown in FIG. 4(*e*), the callout 406 and pointer 408 are removed when the user lifts their finger (not shown) off the surface of the screen, and the desired target is selected.

Techniques for Determining Whether Escalation is to be Performed

In one implementation, a user-input-based trigger can be used to trigger escalation or the "shift pointing technique." For instance, the user can push a button or select another input device to trigger escalation.

In another implementation, a target size-based trigger can be used to trigger escalation or the "shift pointing technique." A processor or other module can determine if occlusion is a problem for the desired target based on the size of the desired target relative to the contact area of the selection entity (e.g., user's finger). For example, because occlusion can be a problem when the smallest dimension of the desired target is smaller than a typical finger contact diameter, the processor or other module can determine if targets are present which are small enough to be occluded by the finger (e.g., the desired target comprises a small target relative to the contact area of the selection entity (e.g., user's finger)). In one implementation, there is an approximate threshold size or "occlusion threshold" where occlusion makes selecting smaller targets error prone. When a user presses on a surface of the screen using their finger to attempt to select a desired target (e.g., touches or applies pressure on the occluded screen area), a processor or other module in the touch screen device determines if the desired target is smaller than the occlusion threshold. If the desired target is smaller than the occlusion threshold, the escalation or shift pointing technique is implemented. By contrast, occlusion will generally not be a problem when the user attempts to select a larger target on the screen. As such, for targets larger than the occlusion threshold, the escalation or shift pointing technique does not render or display a callout on the screen, but instead works like an unmodified touch screen.

In yet another implementation, a dwell timer-based trigger can be used to trigger escalation or the "shift pointing technique." For example, the processor or other module determines if the user's finger has been in contact with the display for more than a threshold time. If the user's finger has been in contact with the display for more than the threshold time, then the processor or other module determines that escalation or shift pointing should be implemented. If the user's finger has been in contact with the display for less than or equal to the threshold time, then the processor or other module determines that escalation or shift pointing should not be implemented, and that a regular, unaided touch screen should be implemented.

Escalation Based on Hesitation and Selection Ambiguity

In yet another implementation, instead of basing the decision of whether or not to escalate based only on the target size-based trigger or only on the dwell timer-based trigger, concepts from both implementations can be combined when deciding whether or not to escalate and use the "shift pointing" techniques in an upcoming targeting attempt.

By using dwell time, the ultimate decision about whether or not to escalate is left to the user. For example, in the complete absence of additional knowledge about target size and locations, a fixed dwell timeout (e.g., 300 milliseconds) can be used. When the fixed dwell timeout expires, escalation or shift pointing should be implemented. However when the touch screen device provides information regarding target sizes and locations, the shift pointing technique can determine or calculate dwell timeout based on "selection ambiguity." In one embodiment, described below with reference to FIGS. 6(*a*) and 6(*b*), a dwell timeout between screen contact and escalation can be defined. The duration of the dwell timeout can vary according to the size of the targets under the user's finger, and selection ambiguity can be determined or estimated by comparing the smallest target size found under the user's finger with an occlusion threshold.

When the target is small compared to the occlusion threshold, the selection ambiguity is relatively high, and the dwell timeout can be set to be very short duration and escalate takes place almost immediately. However, if the target is much larger than the occlusion threshold, then occlusion is not a problem. In this case, escalation is not necessary so the dwell timeout can be set to a longer time enabling users to take advantage of simple, direct touch. As such, for relatively larger targets, the dwell timeout is relatively long and the user can acquire the target without escalation resulting in the same performance as an unmodified touch screen.

For targets around the same size as the occlusion threshold, the degree of selection ambiguity is itself ambiguous (the user may or may not need escalation depending on their confidence in their selection). In this case, the dwell timeout occurs after a short delay just long enough to control escalation invocation with hesitation. If the user wants to escalate or invoke the shift pointing technique, then the user can hesitate by holding their finger on the surface of the screen for a time period. To avoid escalation, the user can immediately lift their finger off the surface of the screen.

Figure 6:
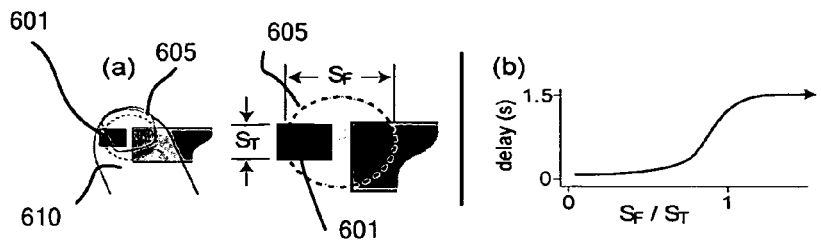
FIG. 6(a) is a diagram which illustrates a contact area of a user's finger when the user attempts to select a target.
FIG. 6(b) is a graph showing how the ratio $S_F/S_T$ can be mapped to a dwell timeout using a logistic function.

FIG. 6(*a*) is a diagram which illustrates a contact area 605 of a user's finger 610 when the user attempts to select a target 601. FIG. 6(*a*) also shows an occlusion threshold ($S_F$), and the smallest dimension ($S_T$) of the smallest target 601 found under the user's finger 610. In one implementation, the occlusion threshold ($S_F$) is the largest dimension of the contact area 605 of the user's finger 610. The occlusion threshold ($S_F$) and the smallest dimension ($S_T$) of the smallest target 601 can be used to compute a ratio of occlusion threshold ($S_F$) to the smallest dimension of the smallest target found under the finger ($S_T$).

FIG. 6(*b*) is a graph showing how the ratio $S_F/S_T$ can be mapped to a dwell timeout using a logistic function. A logistic function is defined by the mathematical formula:

$$P(t) = a \cdot \frac{1 + me^{-t/\tau}}{1 + ne^{\frac{-t}{\tau}}}$$

for real parameters a, m, n, and τ.

The ratio of occlusion threshold ($S_F$) to the smallest dimension of the smallest target found under the finger ($S_T$) can be mapped to a dwell time using the logistic function. In one implementation, the real parameters can be set to a=1, m=0, n=4, and τ=3. As shown in FIG. 6B, when these real parameters are used in the logistic function, this produces a smooth curve mapping small targets to ~0 ms, large targets to ~1500 ms and targets near the occlusion threshold to about 300 ms. In other words, the curve hits a minimum delay time near 0 ms for very small targets; it hits a maximum delay time around 1500 ms for large targets; and for targets near the size of the occlusion threshold it hits a delay time near 300 ms.

Estimating Occlusion Threshold

The occlusion threshold ($S_F$) is roughly related to the finger contact area, but touch sensitive screens commonly used on PDAs and UMPCs only report a single input point and not the finger contact area. An estimate of the occlusion threshold ($S_F$) over time can be determined based on the target sizes for which escalation is used and based on the target sizes for which escalation is not used. We begin with an initial guess $S_F$, then increase the occlusion threshold ($S_F$) by s if the user escalates when $S_F < S_T$ and decrease the occlusion threshold ($S_F$) by s if the user does not escalate and $S_F > S_T$, where $s = w|S_F - S_T|$, and where w is a hand tuned weight to smooth the estimate over time. In one implementation a weight (w) equal to 0.125 can be used to provide a good balance between smoothness and learning rate.

A potential benefit of this scheme is that if the user prefers to use their fingernail (as opposed to their finger or fingertip) to select a target, the occlusion threshold ($S_F$) will shrink so that escalation is instant only for very small targets. For devices that can sense if the stylus is in the device holster, this approach allows learning independent occlusion threshold ($S_F$) values for a finger and a pen input, respectively. In the absence of this sensor data, setting the weight (w) to a relatively high value allows learning a new occlusion threshold ($S_F$) quickly to respond to changes in the user's input style.

FIGS. 7(a)-(d) are diagrams which illustrate exemplary positioning of a callout 706 and pointer 708 relative to different locations of a user's finger 710 on a screen of a touch screen device. FIGS. 7(a)-(d) illustrate that the escalation or shift pointing technique does not result in any inaccessible screen areas. The position of the callout can be displayed at any location within the non-occluded area of the screen relative to the desired target 701 and/or the user's finger 710. For instance, in the diagram shown in FIG. 7(a), the callout 706A is offset directly above the user's finger 710A and the desired target 701A within the non-occluded area of the screen. In FIG. 7(b), to avoid clipping at edges of the screen, the callout 706B is offset to the right and above the user's finger 710B and the desired target 701B within the non-occluded area of the screen. Positioning the callout 706B further towards the middle of the screen can help to avoid clipping near the edges. In FIG. 7(c), to avoid clipping at the top edge of the screen, the desired target 701C is near to the top edge of the display. As such, to avoid clipping, the callout 706C can be offset to the left of the user's finger 710C and slightly below the desired target 701C within the non-occluded area of the screen. It will be appreciated that if it were not possible to offset the callout 706C to the left, then the callout 706C could be offset to the right as shown in FIG. 7(d), where the callout 706D can be offset to the right of the user's finger 710D and slightly below the desired target 701D within the non-occluded area of the screen. By adjusting the relative callout 706 location, the escalation or shift pointing technique handles targets 701 anywhere on the screen, and can prevent clipping issues which can otherwise occur at edges of the screen. In addition, it will be appreciated that "handedness detection" can be used to reverse placement or positioning of a callout 706 for left-handed users.

Correcting for User's Perceived Input Point

Figure 8:
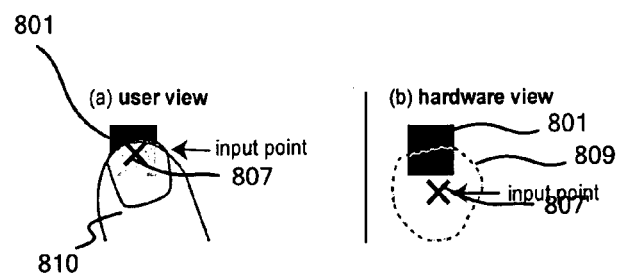
FIG. 8(a) is a diagram showing a target, a user's finger and an input point from the user's perspective.
FIG. 8(b) is a diagram showing a target, a contact area of the user's finger and an input point from the hardware's perspective.

FIG. 8(a) is a diagram showing a target 801, a user's finger 810 and an input point 807 from the user's perspective. In many touch screen devices, a single selection point is computed and is placed roughly at the mean finger contact area. FIG. 8(b) is a diagram showing the target 801, a contact area 809 of the user's finger and an input point 807' from the hardware's perspective. With some users, contact points are oftentimes slightly below the intended target. The shift pointing technique displays pointer position relative to the initial contact point. In some implementations, the location of the pointer relative to the initial contact point can be adjusted to reflect the user's perceived contact point.

For example, in one implementation, the shift pointing technique can adjust the input position based on a single contact point. An estimate of a correction vector (V) which maps the hardware input point 807' to the user's perceived input point 807 can be calculated on a regular basis. For instance, in one implementation, the estimate of a correction vector (V) can be updated by adding a weighted vector between the corrected final lift-off point ($P_2$) and initial contact point ($P_1$): $V_{t+1} = V_t + w(P_2 - P_1)$, where w is a hand-tuned weight. In one implementation, the hand-tuned weight (w) can be set approximately equal to 0.33 to smooth the estimate without making the iterative refinement too slow. This reduces fine-tuning time after the estimate of V converges, allowing users to simply verify the selected target without further adjustment. But unlike the finger, the contact shape of the thumb tends to change depending on the contact location on the display. This makes a single adjustment vector insufficient. A linear interpolation between location specific adjustment vectors can alleviate this problem.

Callout Magnification or "Zooming"

One purpose of escalation or the shift pointing technique is to enable users to acquire targets by avoiding target occlusion. In some use cases, target can be particularly small. For example, while the shift pointing techniques described above work well for acquiring targets which are 6 pixels or more (approximately 2.6 mm), in some cases, a user may want to acquire targets smaller than 6 pixels. In some implementations, the shift pointing technique can be enhanced with zooming and gain manipulation of the control display (CD) ratio manipulation to enhance targeting precision and enable high precision pointing accuracy.

Figure 9:
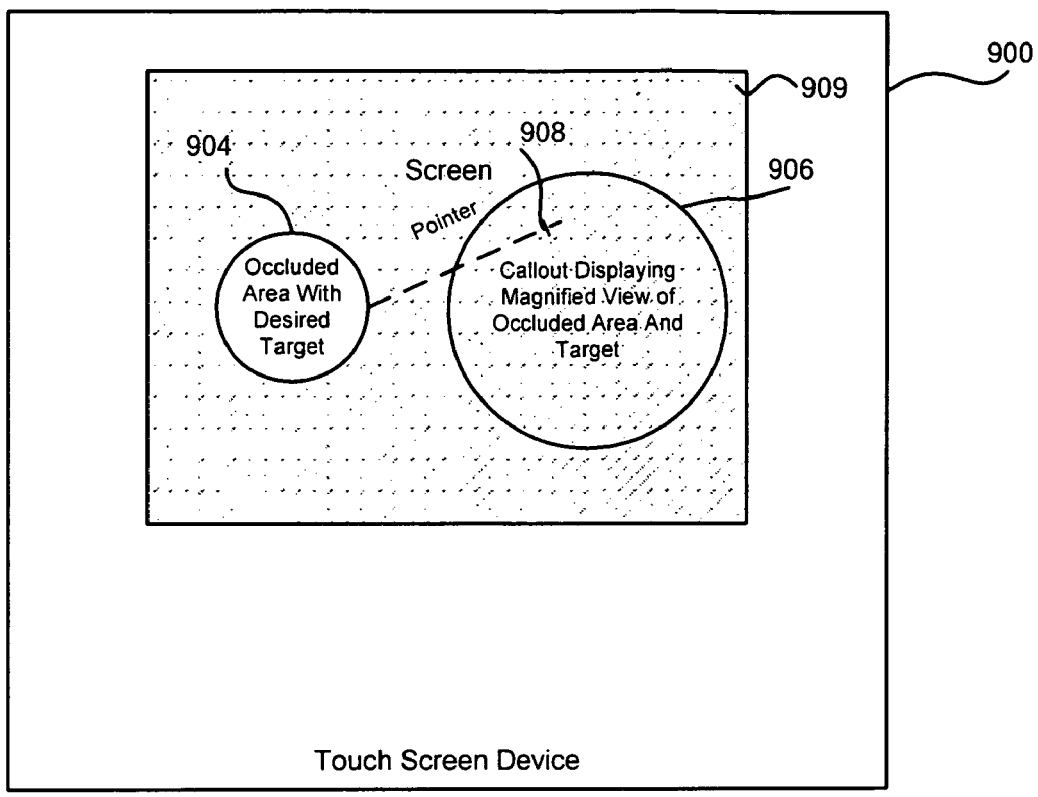
FIG. 9 is a diagram showing a zooming enhancement which can be applied to a callout when the user attempts to select a small target.

FIG. 9 is a diagram showing a zooming enhancement which can be applied to a callout 906 produced by the escalation or shift pointing technique when the user attempts to select a small target. For particularly small targets, the above described techniques can further implement zooming functionality by magnifying the callout 906 and increasing the display ratio of the callout 906 to the occluded screen area the callout 906 reproduces. When zooming functionality is implemented, the reproduction of the occluded screen area which is displayed in the callout 906 is greater in size than the actual area occluded by the user's finger so that the callout 906 presents a magnified version of the occluded screen area.

In some implementations, the callout 906 can be modified so that it now travels with the finger, similar to a tracking menu, so that users can reach content beyond that. Since the finger is no longer mapped directly with pointer 908 position, the callout 906 is moved so that it does not become occluded during the corrective phase. The initial position of the callout 906 can be placed relative to the initial contact point. If the contact point moves beyond a threshold diameter, the callout 906 moves along with the finger 906 similar to a tracking menu. This allows fine-tuning beyond the initial area covered by the frame if the initial contact point was too far from the desired target given the increased zoom space (or increased motor space with high CD ratios).

In the particular example, escalation is performed and the representation of the occluded screen area that is displayed within the callout 906 has been magnified. It will be appreciated that any suitable magnification factor can be used depending on the size of the display, size of the occluded area or the size of the particular target. The higher the callout's magnification, the less content the callout will show. While such a magnification will assure the visibility of a pixel-sized target, it may not be enough to allow for reliable target acquisition. In some implementations, zooming can be further complemented with an enhancement in Control Display (CD) ratio.

Control Display (CD) Ratio Enhancement

The Control Display (CD) ratio is the mapping between real finger movement (the "Control") to movement of the system pointer on the display (the "Display"). By increasing the CD ratio above 1, the finger needs to move further than the pointer to cover a certain pointer distance. By decreasing the CD ratio below 1, the finger can move a shorter distance than the pointer to cover a certain pointer distance. This manipulation is also referred to as "gain" which is the inverse of CD ratio. The gain increases or decreases the resulting pointer movement, given some control movement. If the gain is low, then the pointer movement is less than a certain control movement.

To allow users to aim for a target, many touch screen devices are operated with a CD ratio of 1. For example, the pointer position can be mapped 1:1 with the finger input position. However, once the user's finger is in contact with the screen, a pointer can be displayed providing users with visual feedback. Then, finger movement can control the pointer in a relative manner, with the pointer moving faster or slower than the finger directing it. To address this, in an enhanced version of the shift pointing technique, CD ratios can be adjusted to up to 8:1 when escalated. Pointer movement across the screen is slowed down expanding a 1 pixel target to 8 pixels in motor space. In alternative implementations, the CD ratio can be adjusted with a pantograph-like handle or based on distance from the initial touch point for the purpose of stabilization.

As discussed above, regardless of the target's original position, the callout is positioned to avoid occlusion by the finger. In some cases moving the finger makes the original target position no longer occluded. Since the touch sensitive display has a finite input area, increasing CD ratio above 1 reduces the range of "motor space" to 1/CD of display space. The finger movement in control space can be referred to as "motor space" movement because people control this movement with their cognitive motor processes. This can be a problem if the initial contact point is X pixels away from the edge of the display and more than X/CD pixels further away from the target. Since the shift pointing technique employs lift-off selection, there is no way for the user to select the target. To address this issue, the shift pointing technique can be modified to snap to a point closer to the edge where all intermediate pixels were selectable or using pointer acceleration so that a quick succession of long-slow and short-fast movements could simulate clutching.

While at least one example embodiment has been presented in the foregoing detailed description, it should be appreciated that a vast number of variations exist. It should also be appreciated that the example embodiment or embodiments described herein are not intended to limit the scope, applicability, or configuration of the systems, methods, or devices in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. In a touch screen device comprising a screen, a method for touch input comprising:
    displaying a target on the screen;
    conditionally rendering a callout on the screen in response to an attempt by a user to select the target with a selection entity, wherein the callout comprises a representation of an occluded area of the screen in a non-occluded area of the screen, the callout is rendered when it is determined based on interaction with the user that occlusion is a problem for the target entity under the selection entity, the callout is not rendered when it is determined that occlusion is not a problem for the target under the selection entity, and the interaction with the user comprises contacting the occluded area of the screen with the selection entity to attempt to select the target displayed on the screen under the selection entity; and
    determining that occlusion is a problem for the target under the selection entity if the selection entity is in contact with the display for more than a threshold time.

2. A method according to claim 1, further comprising:
    rendering a pointer representing an actual contact point on the screen.

3. A method according to claim 2, further comprising:
    guiding the pointer over a representation of the target displayed in the non-occluded area of the screen.

4. A method according to claim 3, further comprising:
    committing to target acquisition when the pointer is over the representation of the target displayed in the non-occluded area of the screen.

5. A method according to claim 1, wherein the occluded area comprises an area of the screen which includes the target and which is covered by a selection entity.

6. A method according to claim 1, wherein determining if occlusion is not a problem for the target under the selection entity is based on size of the target.

7. A method according to claim 6, wherein the callout is not rendered when the target comprises a target which is relatively large with respect to the occluded area.

8. A computer-readable storage medium having computer-executable instructions stored thereon causing a computer to perform the method recited in claim 1.

9. A method according to claim 1, wherein the interaction with the user comprises a command to render the callout that is received from a user.

10. A method according to claim 1, wherein the actual contact point is a current selection point of the selection entity on the screen, and wherein rendering a callout comprises:
    displaying the callout in the non-occluded area responsive to contact with the occluded area of the screen, wherein the callout comprises the representation of the occluded area of the screen in the non-occluded area of the screen.

11. A method according to claim 10, wherein guiding the pointer over a representation of the target displayed in the non-occluded area of the screen comprises:
    keeping the selection entity on the screen; and
    guiding the pointer, based on visual feedback provided by the callout, over the representation of the target displayed in the non-occluded area of the screen by moving the selection entity on the surface of the screen.

12. A method according to claim 11, wherein committing to target acquisition when the pointer is over the representation of the target displayed in the non-occluded area of the screen, comprises:
    lifting the selection entity off the surface of the screen to define the selection point when the pointer is over the representation of the target displayed in the non-occluded area to select the target; and removing the callout when the selection entity is lifted off the screen.

13. In a touch screen device comprising a screen, a method for touch input comprising:

displaying a target on the screen;

rendering a callout on the screen in response to an attempt to select the target, wherein the callout comprises a representation of an occluded area of the screen in a non-occluded area of the screen, wherein the attempt to select the target comprises contacting the occluded area of the screen with a selection entity to attempt to select the target displayed on the screen under the selection entity;

determining if occlusion is a problem for the target under the selection entity, wherein the callout is rendered if occlusion is a problem for the target under the selection entity and the callout is not rendered if occlusion is not a problem for the target under the selection entity, wherein determining if occlusion is a problem for the target under the selection entity comprises determining if occlusion is a problem for the target under the selection entity based on a dwell timeout period;

rendering a pointer representing an actual contact point on the screen;

guiding the pointer over a representation of the target displayed in the non-occluded area of the screen; and committing to target acquisition when the pointer is over the representation of the target displayed in the non-occluded area of the screen.

14. A computer-readable storage medium having computer-executable instructions stored thereon causing a computer to perform the method recited in claim 13.

15. In a touch screen device comprising a screen, a method for touch input comprising:

displaying a target on the screen;

rendering a callout on the screen in response to an attempt to select the target, wherein the callout comprises a representation of an occluded area of the screen in a non-occluded area of the screen, wherein the attempt to select the target comprises contacting the occluded area of the screen with a selection entity to attempt to select the target displayed on the screen under the selection entity;

determining if occlusion is a problem for the target under the selection entity, wherein the callout is rendered if occlusion is a problem for the target under the selection entity and the callout is not rendered if occlusion is not a problem for the target under the selection entity, wherein determining if occlusion is a problem for the target under the selection entity comprises determining that occlusion is a problem for the target under the selection entity based on a command received from a user;

rendering a pointer representing an actual contact point on the screen;

guiding the pointer over a representation of the target displayed in the non-occluded area of the screen; and committing to target acquisition when the pointer is over the representation of the target displayed in the non-occluded area of the screen.

16. A computer-readable storage medium having computer-executable instructions stored thereon causing a computer to perform the method recited in claim 15.

17. A touch screen device comprising:

a touch screen for displaying information comprising a target;

a computer-readable storage medium having stored computer-executable instructions for conditionally rendering a callout on a non-occluded area of the touch screen responsive to an attempt by a user to select a target displayed on the touch screen with a selection entity, wherein the screen includes an occluded area which includes the target and which is covered by the selection entity, and wherein the callout comprises a representation of the occluded area of the screen in the non-occluded area of the screen, the callout is rendered when it is determined based on interaction with the user that occlusion is a problem for the target entity under the selection entity, and the callout is not rendered when it is determined that occlusion is not a problem for the target under the selection entity;

a computer-readable storage medium having stored computer-executable instructions for rendering a pointer on the non-occluded area of the touch screen responsive to the attempt to select the target displayed on the touch screen, wherein the pointer represents an actual contact point of the selection entity on the screen and wherein the pointer is movable over the representation of the target displayed in the non-occluded area of the touch screen, wherein the target is selected by lifting the selection entity off the surface of the screen while the pointer is over the representation of the target displayed in the non-occluded area;

a computer-readable storage medium having stored computer-executable instructions for determining if occlusion is a problem for the target under the selection entity when the selection entity presses on a surface of the touch screen to attempt to select the target displayed on the screen for more than a threshold time; and a computer-readable storage medium having stored computer-executable instructions for removing the callout when the selection entity is lifted off the touch screen.

18. A touch screen device according to claim 17, wherein the interaction with the user comprises a command to render the callout that is received from a user.

19. A display device comprising a screen designed to display at least one target which can be selected by pressing on a surface of the screen using a selection entity, the display device comprising:

a callout, conditionally rendered in a non-occluded area of the screen responsive to an attempt by a user to select the target using a selection entity, wherein the callout comprises a representation of an occluded area of the screen which includes the target and which is covered by the selection entity, wherein the representation of the occluded area comprises a representation of the target, the callout is rendered when it is determined based on interaction with the user that occlusion is a problem for the target entity under the selection entity, the callout is not rendered when it is determined that occlusion is not a problem for the target under the selection entity, the interaction with the user comprises contacting the occluded area of the screen with the selection entity to attempt to select the target displayed on the screen under the selection entity, and wherein it is determined that occlusion is a problem for the target under the selection entity if the selection entity is in contact with the display for more than a threshold time.

20. A display device according to claim 19, wherein the callout is not displayed when the user attempts to select a target on the screen of the display device which is larger than the occluded area.

21. A display device according to claim 19, further comprising:
- a pointer representing an actual contact point of the selection entity on the screen, wherein the pointer is displayed in the non-occluded area, and wherein the actual contact point represents an actual current actual contact point within the occluded area, and
- wherein the pointer is movable by moving the selection entity on the surface of the screen, and wherein visual feedback provided to the user by the callout allows a user to move the pointer over the representation of the target displayed in the non-occluded area of the screen.

22. A display device according to claim 19, wherein the interaction with the user comprises a command to render the callout that is received from a user.

* * * * *